United States Patent
Lamont

[11] Patent Number: 6,158,953
[45] Date of Patent: Dec. 12, 2000

[54] WIND TURBINE WITH VARIABLE POSITION BLADES

[76] Inventor: John S Lamont, 30th Floor, 360 Main Street, Winnipeg, Manitoba, Canada, R3C 4G1

[21] Appl. No.: 09/205,604

[22] Filed: Dec. 4, 1998

[51] Int. Cl.[7] ...................................................... F03D 7/00
[52] U.S. Cl. ........................... 415/4.4; 415/4.2; 415/125; 415/907; 416/17; 416/116; 416/119
[58] Field of Search .............................. 415/4.1, 4.2, 4.4, 415/125, 130, 144, 208.1, 907, 2.1, 53.1, 53.2, 53.3, 905; 416/17, 24, 112, 116, 119, 153, DIG. 4, 3, 98, 108, 111

[56] References Cited

U.S. PATENT DOCUMENTS

| | | |
|---|---|---|
| 1,903,307 | 4/1933 | Gillio . |
| 2,667,589 | 1/1954 | Levrero . |
| 3,944,840 | 3/1976 | Troll . |
| 4,031,405 | 6/1977 | Asperger . |
| 4,047,834 | 9/1977 | Magoveny et al. . |
| 4,162,410 | 7/1979 | Amick . |
| 4,179,007 | 12/1979 | Howe . |
| 4,278,896 | 7/1981 | McFarland . |
| 4,288,704 | 9/1981 | Bosard . |
| 4,291,235 | 9/1981 | Bergey, Jr. et al. ....................... 290/55 |
| 4,350,900 | 9/1982 | Baughman .............................. 415/907 |
| 4,398,096 | 8/1983 | Faurholtz . |
| 4,508,973 | 4/1985 | Payne . |
| 5,038,049 | 8/1991 | Kato . |
| 5,083,899 | 1/1992 | Koch ......................................... 415/2.1 |
| 5,211,539 | 5/1993 | McCarty .................................... 416/61 |
| 5,332,354 | 7/1994 | Lamont .................................... 415/4.2 |
| 5,967,749 | 10/1999 | Eaves et al. ................................. 416/3 |

FOREIGN PATENT DOCUMENTS

| | | | |
|---|---|---|---|
| 1251 | 7/1977 | Japan ..................................... 415/2.1 |
| 2275085 | 8/1994 | United Kingdom ................... 415/905 |

*Primary Examiner*—F. Daniel Lopez
*Assistant Examiner*—James M McAleenan
*Attorney, Agent, or Firm*—Burns, Doane, Swecker & Mathis, L.L.P.

[57] ABSTRACT

A wind turbine has an internal rotor carrying a plurality of turbine vanes in a circular path between an inlet opening and an exhaust opening. The inlet opening includes a stationary dividing vane that delivers one portion of the inlet airflow to a primary flowpath traversing the turbine vanes at two locations. The stationary dividing vane also delivers a second portion of the inlet airflow to a second flowpath which drives the turbine vanes as those vanes move in the part of the circular path from the exhaust opening toward the inlet opening. The turbine vanes may be mounted so as to have variable angular positions in different portions of the circular path. Turbine vane position can be controlled either magnetically or mechanically. Where vane position is varied magnetically, a plurality of permanent magnets with suitable controls adjust the turbine vane position. Where vane position is varied mechanically, a pair of cam arrangements may be employed.

10 Claims, 8 Drawing Sheets

WIND TURBINE WITH VARIABLE POSITION BLADES

BACKGROUND OF THE INVENTION

The present invention relates generally to wind driven turbines. More particularly, the invention concerns a partial admission centrifugal turbine powered by atmospheric wind to drive an electrical generator.

Wind driven generators are known in the art. For example, a wind powered generator using a wind driven rotor having a plurality of parallel vanes arranged circumferentially around a vertical axis has been used to drive a generator. A housing around the rotor has a movable inlet vane to direct wind toward one side of the rotor. The housing itself may be rotatable so as to adjust to the direction of oncoming wind. Further, if desired, the assembly can be mounted on top of an automobile. See U.S. Pat. No. 5,038,049, issued to Kato on Aug. 6, 1991.

Generators are also known in which air supplied by wind is separated into a plurality of parallel portions which are applied to different parts of the rotor. See U.S. Pat. No. 4,350,900, issued to Baughman on Sep. 21, 1982. Moreover, various configurations for wind driven vanes used in wind turbines are known, such as symmetric airfoil shaped vanes of the Baughman patent, straight but radially canted vanes (see U.S. Pat. No. 4,179,007 issued to Howe on Dec. 18, 1979), radially curved vanes without inlet flow direction (see U.S. Pat. No. 4,278,896, issued to McFarland on Jul. 14, 1981; U.S. Pat. No. 4,031,405, issued to Asperger on Jun. 21, 1977; and U.S. Pat. No. 2,667,589, issued to Levrero on Jan. 26, 1954), radially curved vanes with inlet flow direction (see U.S. Pat. No. 4,047,834, issued to Magoveny et al. on Sep. 13, 1977; and 1,903,307, issued to Gillio on Apr. 4, 1933), Darrieus type rotors (see U.S. Pat. No. 4,162,410, issued to Amick on Jul. 24, 1979). It is also known to provide a variable area throat arrangement for wind driven turbines. See U.S. Pat. 3,944,840, issued to Troll on Mar. 16, 1976.

Other rotor arrangements, such as axial flow configurations, are also known, including for example, U.S. Pat. No. 4,508,973, issued to Payne on Apr. 2, 1985, U.S. Pat. No. 4,398,096, issued to Faurholtz on Aug. 9, 1983, and U.S. Pat. No. 4,288,704, issued to Bosard on Sep. 8, 1981.

In general, however, the known prior art devices use turbine blades like windmills, that is, wind is used to push the blades. Some prior art devices use the turbine blades such that wind aerodynamically interacts with the blades to drive them. However, the known prior art devices are not seen to adjust the blade position in different parts of a blade channel to adjust the angle θ of attack for those blades to the aerodynamic conditions existing in the different parts of the channel. Accordingly, the prior art devices do not use the atmospheric power source in the most advantageous manner.

SUMMARY OF THE INVENTION

A wind driven turbine which overcomes the problems and disadvantages of the prior art devices includes a plurality of turbine blades arranged circumferentially in a rotor about an axis of rotation, and parallel with that axis. The rotor is mounted in a housing which provides a primary air inlet, a secondary air inlet, an air outlet, and a baffle means for directing air flow from the primary and secondary air inlets to the air outlet such that a portion of the ingested air passes through the turbine blades once, a second portion of the ingested air passes through the turbine blades twice, and the secondary air flow passes through the turbine blades twice.

By arranging the secondary air inlet near the air outlet, the arrangement permits the primary air flow to act against the turbine blades receding from the primary air inlet while the secondary air flow acts against turbine blades advancing toward the primary air inlet. Thus, the secondary air flow substantially eliminates what would otherwise be a vacuum drag on the advancing turbine blades as they move toward the primary air inlet. The secondary air flow may also provide some additional motive force to the turbine blades in the secondary passage. Accordingly, an increased mechanical advantage on the rotating turbine blades is obtained through the substantial elimination of vacuum drag.

In order to adjust the angle θ of attack of the turbine blades in different parts of the blade channel, each turbine blade is mounted so as to be rotatable about an axis. That axis extends generally longitudinally through the blade and is parallel to the axis of rotation for the turbine. Each blade is also provided with a mechanism for adjusting the position of the blade so that the angle θ of attack for the blade can be varied.

In the simplest arrangement, the blades should be movable between two positions: a first position during which the blade is acted upon by the primary air flow, and a second position during which the blade is acted upon by the secondary air flow. Of course, there could be situations where it may be desirable to use even more positions for the blades at different circumferential positions of the rotor assembly.

The blade adjusting arrangement could employ a cam and cam-follower arrangement, if desired. For example, each blade may have a cam follower on one end while the wind turbine housing has the cam surface. As the rotor assembly revolves within the housing, the cam surface is stationary, but the cam follower on each blade causes the orientation of the blade relative to the rotor assembly to change. As a consequence, the angle θ of attack for each turbine blade can be adjusted between first and second positions each revolution of the rotor assembly.

Alternatively, the blade adjusting arrangement could use a magnetic arrangement to move the turbine blades between first and second positions. A movable permanent magnet carried by each turbine blade may be magnetically attracted to the opposite pole of a fixed permanent magnet at one position. Similarly, a fixed permanent magnet of opposite polarity (to the movable magnet) can be positioned at the second position. A magnetic tripping mechanism can move the movable magnet from one magnetic detent position to the other and back, as required during movement of the rotor assembly.

BRIEF DESCRIPTION OF THE DRAWINGS

Many objects and advantages of the wind turbine according to the present invention will be apparent to those skilled in the art when this specification is read in conjunction with the attached drawings wherein like reference numerals are applied to like elements and wherein.

DETAILED DESCRIPTION OF THE PREFERRED EMBODIMENTS

Figure 1:
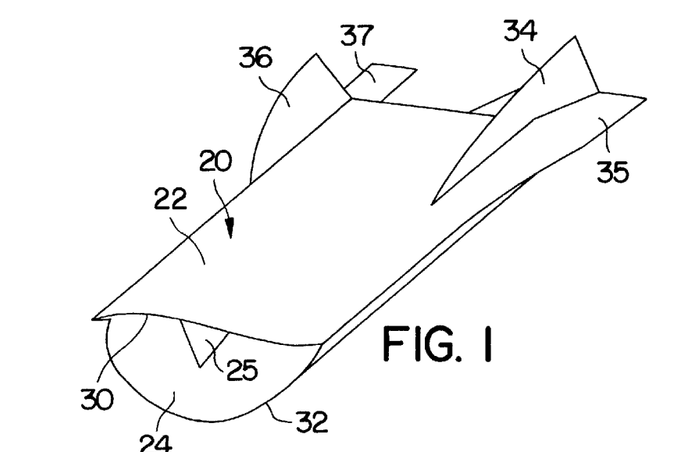
FIG. 1 is a schematic perspective of the external configuration of a wind turbine according to this invention.

A wind driven turbine assembly 20 (see FIG. 1) includes a primary housing 22 which may be fashioned from sheet metal, plastic material, fiber reinforced composite material, or any other suitable conventional engineering material. Since the entire structure of the turbine assembly 20 needs to be responsive to wind direction, it is important that all materials used in the construction be as light as possible. To this end, sheet material can be used as much as possible to assure that the structure is light.

The housing 22 preferably includes a primary inlet opening 24 (see FIG. 2), at least one secondary inlet opening 26 (see FIG. 2), and an exhaust opening 28. The primary inlet opening 24 is laterally spaced from the secondary inlet opening 26 by a stationary dividing vane 25 (see FIG. 2). These various openings communicate with one another through internal flow passages in the manner to be described.

Figure 2:
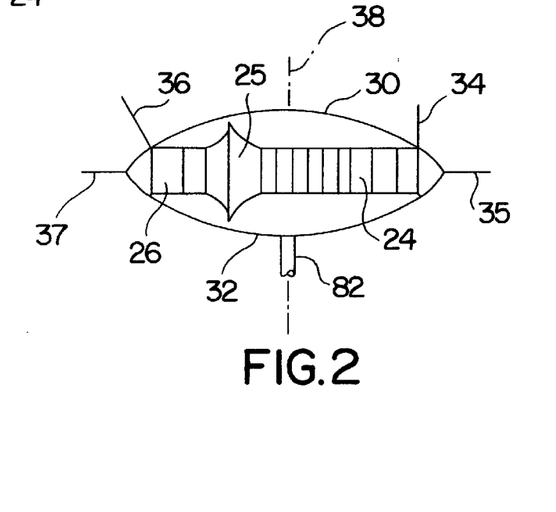
FIG. 2 is a front elevational view of the wind turbine of FIG. 1.

The primary inlet opening 24 is positioned at one end of the housing 22 and includes a forward edge 30 of the primary inlet opening 24 that curves outwardly and forwardly at the center. In addition, the forward edge 32 of the bottom curves downwardly. The outward curvature of the forward edge 30 above the top and of the forward edge 32 below the bottom is effective to increase the capture area for the turbine assembly 20. The outward curvature of the forward edges 30, 32 forwardly of the turbine assembly 20 provides an arcuate capture area across the front of the turbine assembly 20.

Figure 3:
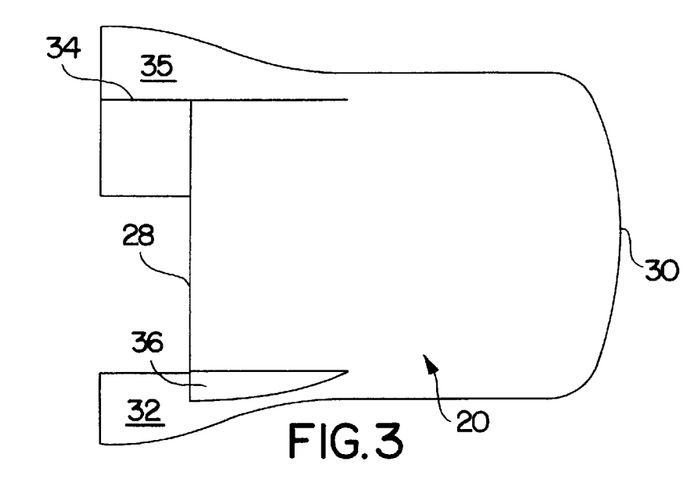
FIG. 3 is a top plan view of the wind turbine of FIG. 1.

The turbine assembly 20 is mounted on a rotatable shaft 82 (see FIG. 4) having a generally vertical axis 38 so that the turbine assembly 20 can autorotate to face the oncoming wind. The rotatable shaft 82 can be suitably mounted to the desired supporting structure so that the turbine assembly is free to rotate. The turbine assembly 20 includes a steering arrangement to turn the turbine assembly about the axis 38 so as to orient the inlet openings 24, 26 toward the approaching wind. The steering arrangement includes a first stabilizer vane 34 and a second stabilizer vane 36. The first stabilizer vane 34 is located at the back of the turbine assembly 20, adjacent to the exhaust opening 28, and is positioned on the side of the assembly 20 behind the primary inlet 24. The first stabilizer vane 34 (see FIG. 2) extends generally vertically with respect to the axis of rotation 38 for the wind turbine assembly 20. The second stabilizer vane 36 is located at the back of the turbine assembly 20, adjacent to the exhaust opening 28, and is positioned on the side of the assembly behind the secondary inlet 26. (See FIG. 3). The second stabilizer vane 36 is not vertical and has an acute angle θ with respect to the first stabilizer vane 34. (See FIG. 2).

The first stabilizer vane 34 extends rearwardly from the turbine assembly 20 so that it extends beyond the plane of the exhaust opening 28. (See FIG. 3). As a result, the first stabilizer vane 34 has a larger surface area than the secondary stabilizer 36 and is the primary device for orienting the turbine assembly 20 so that the inlet openings 24, 26 face the incoming air.

Figure 4:
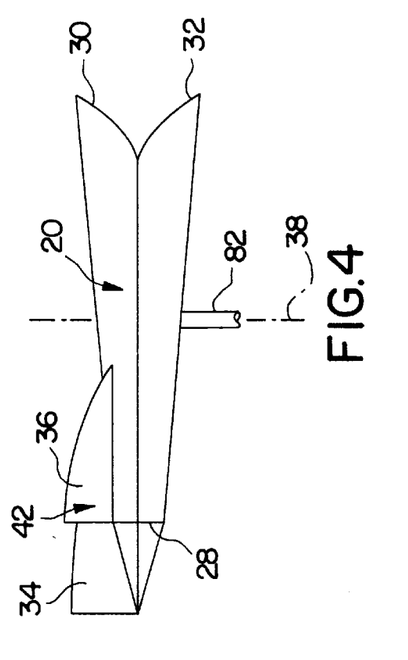
FIG. 4 is a side elevational view of the wind turbine of FIG. 1.

As best seen in FIG. 4, the external contours of the turbine assembly 20 are such that the vertical height of the assembly 20 decreases from the forward edges 30, 32 toward the exhaust opening 28 at the back of the assembly 20.

While the stabilizers 34, 36 (see FIG. 4) are illustrated as being generally plate like appendages, their shape and location are not important. The important aspect is the efficacy of the stabilizers 34, 36 as a guidance means 42 to compensate for unbalanced forces associated with the secondary inlet opening 26 and to keep the primary inlet opening 24 aligned with the ambient wind. Furthermore, if desired, the guidance means 42 can be controllable in a suitable conventional manner so that it generates different force levels as may be necessary at different wind velocities to properly orient the inlet opening 24 with the ambient wind direction. In addition to the vertical stabilizers 34, 36, the guidance means 42 of the wind turbine assembly 20 also includes a pair of horizontal stabilizers 35, 37—one on each side of the wind turbine assembly 20, positioned outboard of the corresponding vertical stabilizers 34, 36 at the back of the assembly 20, and extending to a position generally coextensive with the rearward projection of the vertical stabilizer 34.

Figure 5:
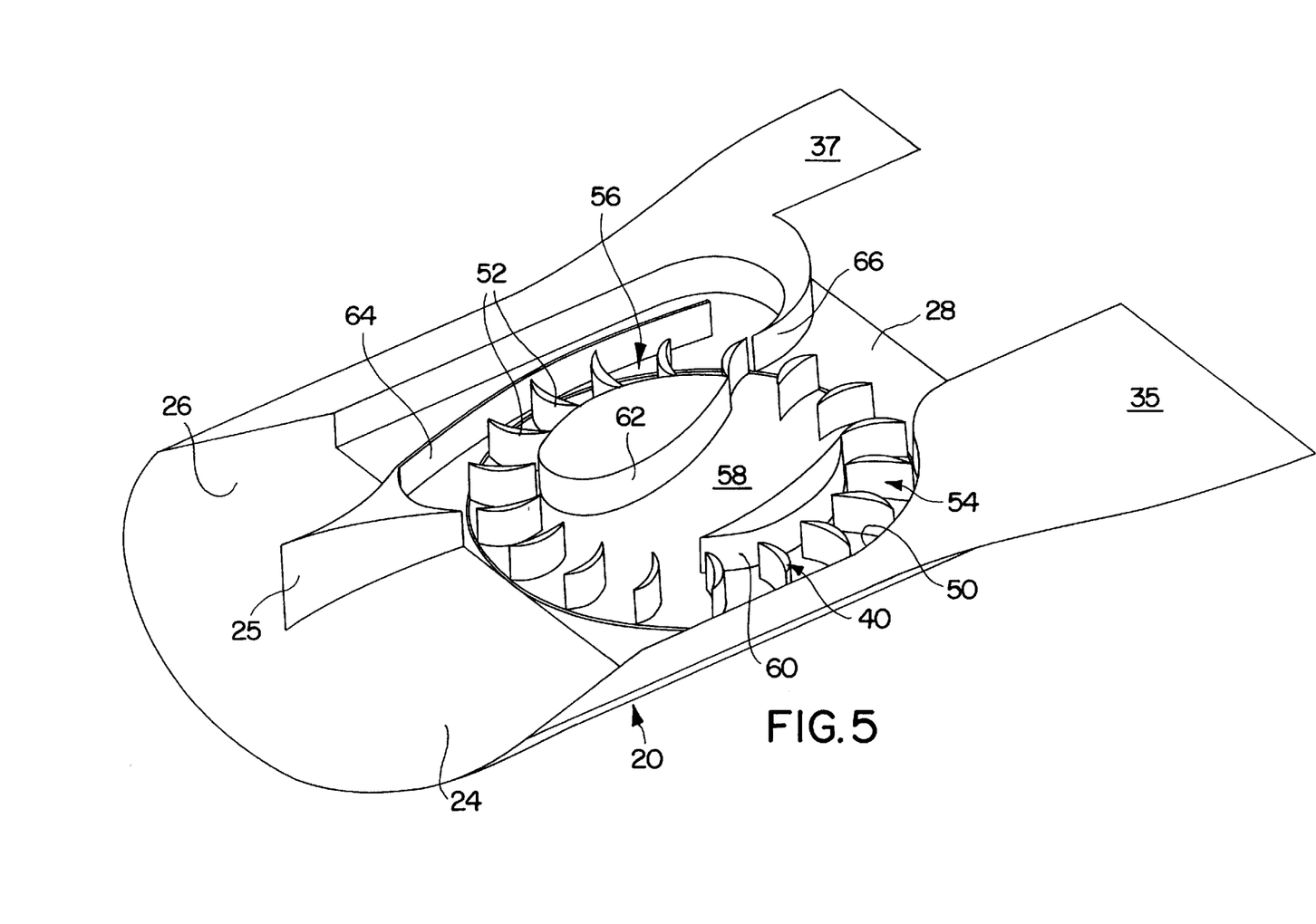
FIG. 5 is a view of the wind turbine of FIG. 1 with the top portion removed to illustrate the internal features thereof.

As can be seen more clearly in FIG. 5, walls of the dividing vane 25 and surfaces of the inlet define area constrictions in the cross-sectional flow area within the turbine assembly 20—one constriction being in the primary inlet opening 24, another constriction being in the secondary inlet opening 26. These area constrictions serve to accelerate the air flow into the turbine assembly 20.

A baffle arrangement (sees FIG. 6) inside the housing 22 directs a primary airflow from the primary inlet 24, through a rotor assembly 40 to the outlet or exhaust opening 28. In addition, the baffle arrangement of the turbine assembly 20 directs a secondary airflow from the secondary inlet 26, through the rotor assembly 40 and, ultimately, to the exhaust opening 28. The baffle arrangement also defines an annular path 50 in which an annular cascade of turbine blades 52 of the rotor assembly 40 is positioned.

Figure 6:
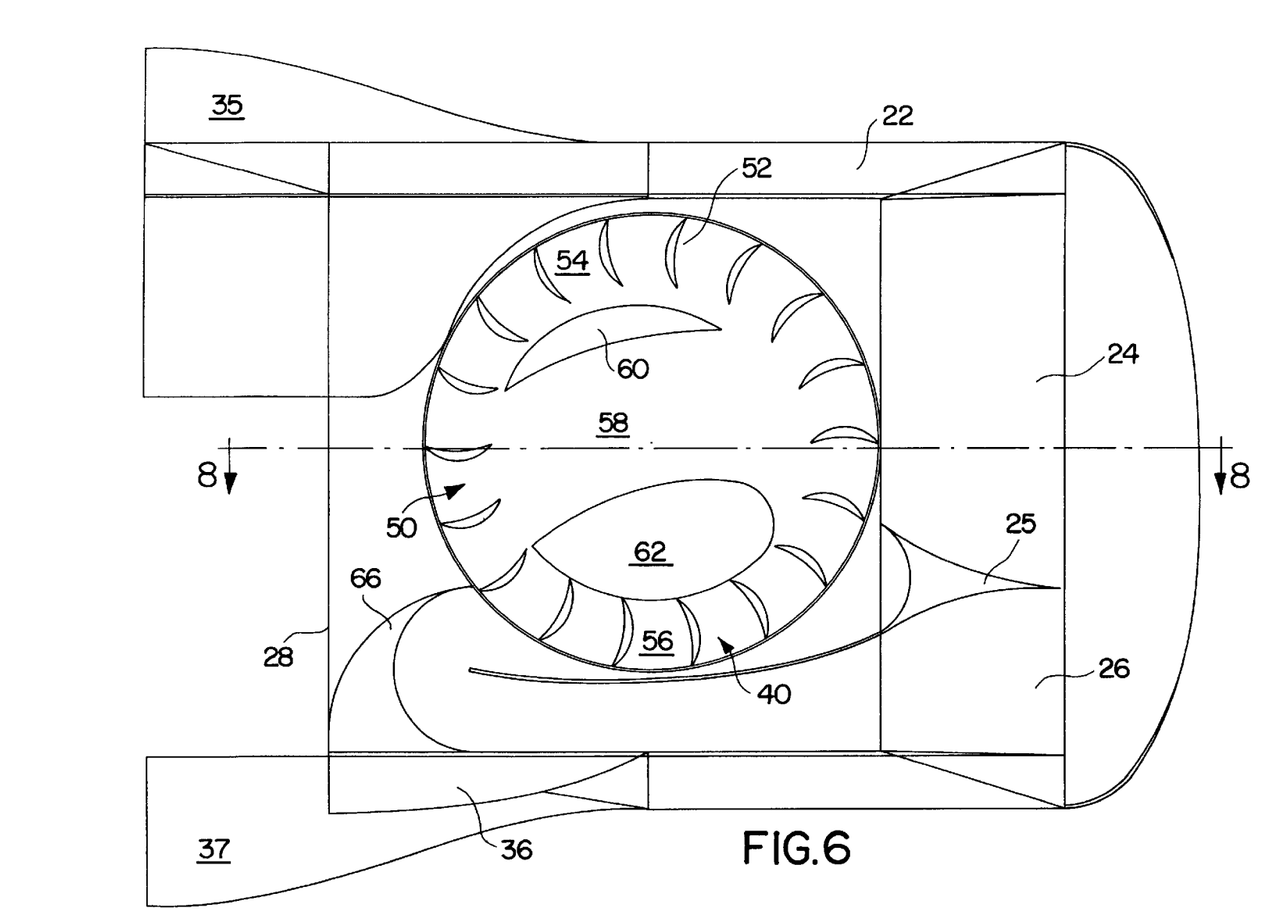
FIG. 6 is a schematic plan view of the air flow path through the wind turbine of FIG. 1.

A central part of the baffle arrangement defines the inner surface of the annular path 50 and is divided into two portions 54, 56. The first of these portions 54 carries a portion of the primary airflow; while the second of these portions 56 carries the secondary airflow. The baffle arrangement also defines a central flow channel 58 which is positioned within the annular cascade of turbine blades. The baffle arrangement includes a first pillar wall 60 having a crescent-shaped cross section and a second pillar wall 62 having a airfoil-shaped cross section. The first pillar wall 60 cooperates with the baffle arrangement to define a converging portion of the annular channel 54 through which the turbine blades 52 move. A portion of the primary airflow moves through the converging channel 54. Similarly, the second pillar wall 62 cooperates with the baffle arrangement to define a second converging portion of the annular channel portion 56 through which the turbine blades 50 move. The secondary airflow passes through the annular channel portion 56. The first and second pillar walls 60, 62 also define a central passage or channel 58 between the primary inlet 24 and the outlet 28. The precise contour for the primary and secondary inlets 24, 26 may be varied to accommodate conventional design parameters and flowpath analyses.

In FIG. 5, the baffle arrangement also includes a wall 64 extending from the dividing vane 25 and cooperating with the second pillar wall 62 to substantially define the secondary airflow passage. A cusp-shaped wall 66 toward the back of the turbine assembly 20 serves to define the remaining portion of the secondary airflow passage as well as part of the exhaust opening 28.

Figure 7:
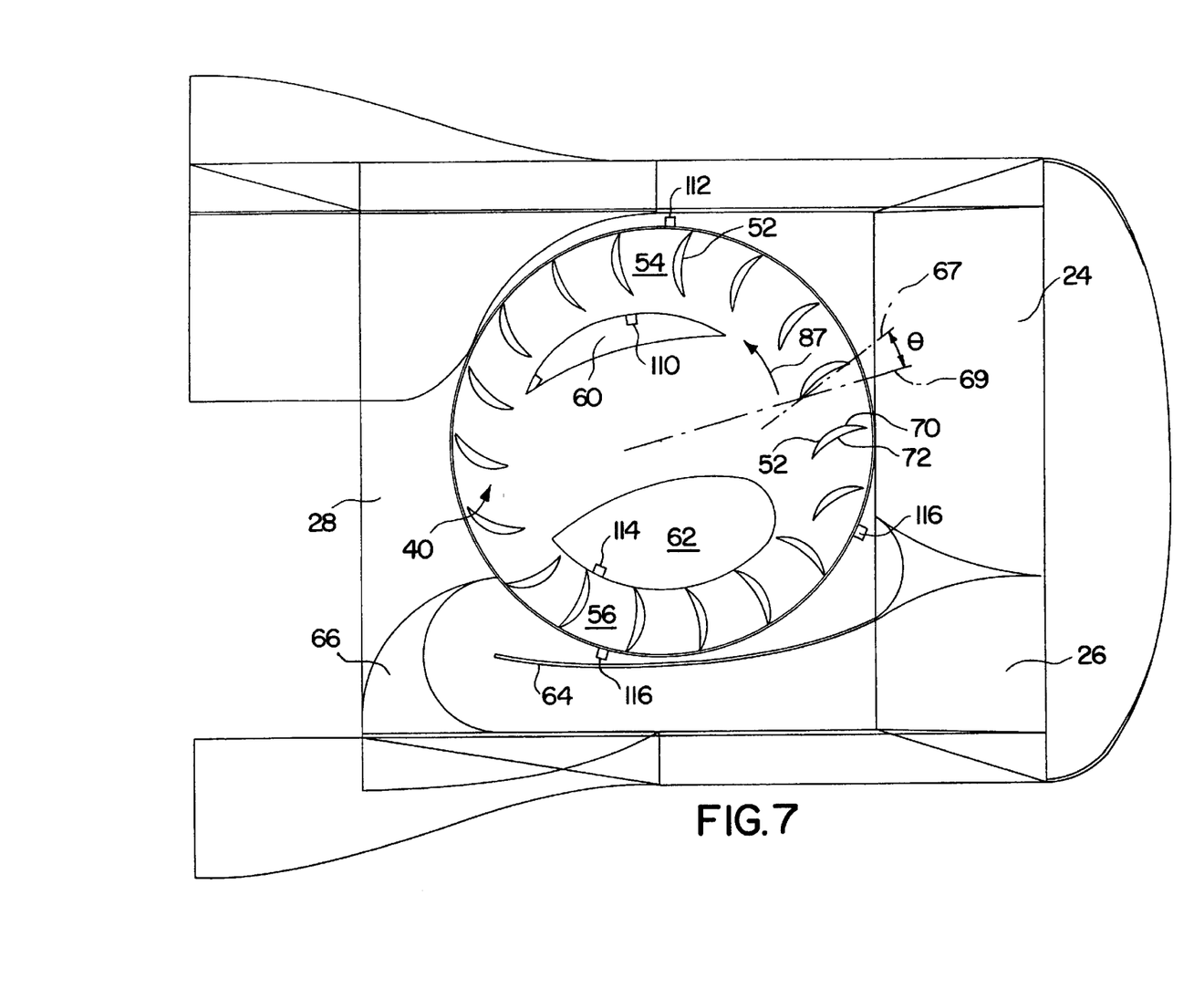
FIG. 7 is a schematic plan view of the air flow path through the wind turbine of FIG. 1 with variable position turbine blades.

For the embodiment of FIG. 6, the turbine blades 52 are mounted to the rotor assembly so as to be spatially fixed on the rotor assembly 40. In FIG. 7, however, the turbine blades are designed to provide a variable position, or variable angle $\theta$ of attack, to air passing through the turbine assembly. More particularly, as the blades pass the primary inlet opening 24, pass through the channel portion 54, and traverse the outlet opening 28, the blades 52 have a first position selected so that the work extracted from air flowing through the turbine assembly 20 is optimized for practical purposes. However, as the blades pass through the channel portion 56 and are acted upon by the secondary airflow, the turbine blades 52 assume a second position so that work extracted from the secondary airflow in this channel 56 is optimized for practical purposes. Several arrangements for adjusting the position of the turbine blades during rotation of the rotor assembly 40 will now be described.

Figure 8:
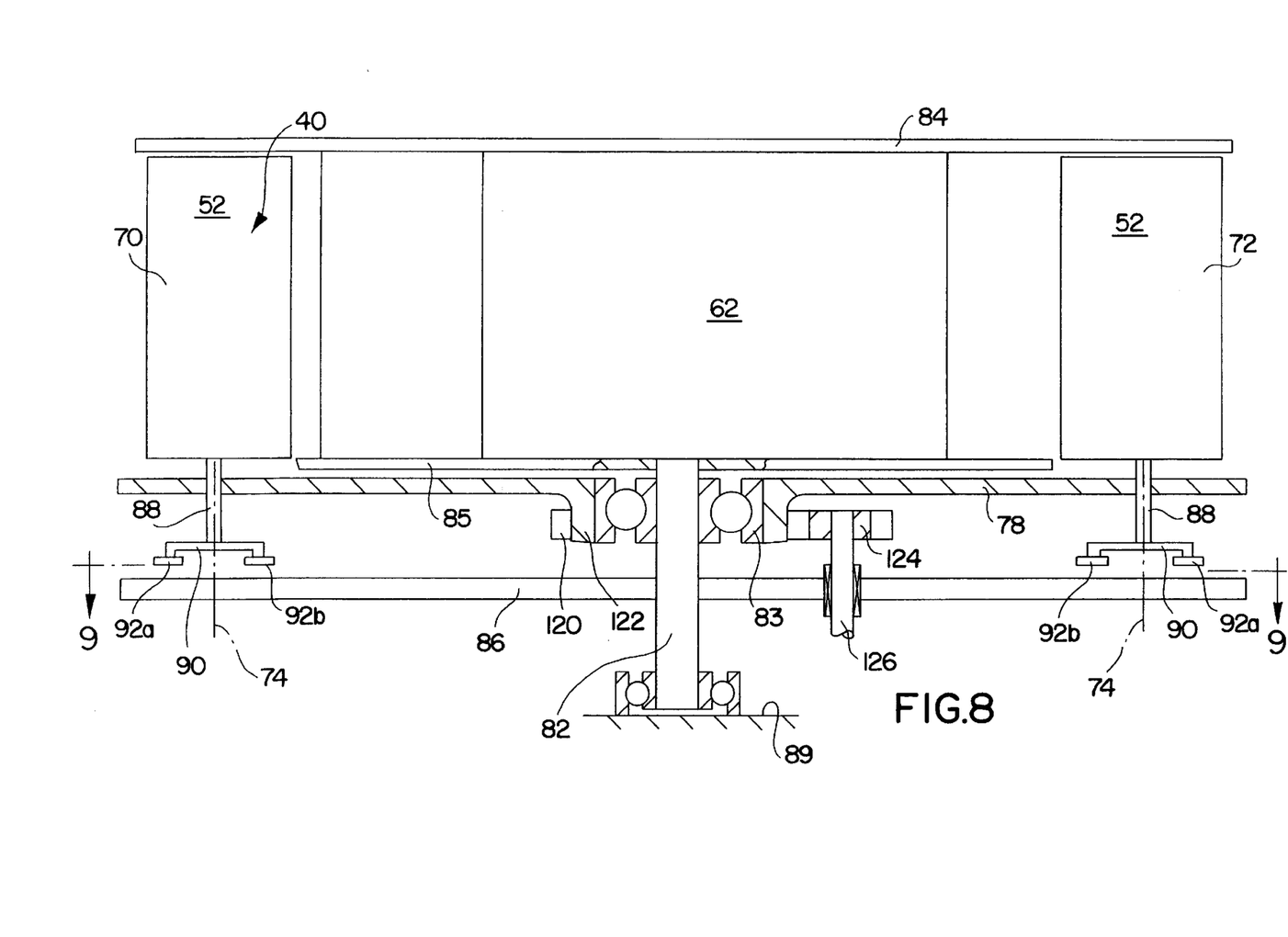
FIG. 8 is a side elevational view taken along line 8—8 of FIG. 6 with portions broken away for the sake of clarity of an embodiment with mechanically controlled variable position turbine blades.

Each blade 52 in the annular cascade is generally cylindrical in shape in that the generatrix of the walls moves in a closed path in a plane. Moreover, each blade 52 has a concave wall portion 72, and a convex wall portion 70. The convex wall portion 70 protrudes in the direction of circular movement of the annular cascade about a vertical axis of rotation. The blades 52 are mounted to the rotor assembly 40 (see FIG. 8), preferably so that each blade 52 can move with respect to its own longitudinal axis 74. While many different arrangements for the rotor assembly 40 will occur to those skilled in the art, a simple possibility is depicted in FIG. 8. For example, the rotor assembly 40 may include at least one generally circular, generally planar plate 78 that is rotatably mounted on a corresponding stub shaft 82 of the baffle assembly by one or more suitable conventional bearings 83. The first and second pillar walls 60, 62 may be attached to upper and lower generally parallel plates 84, 85, which comprise part of the baffle arrangement and cooperate to define the fluid flow paths partially described above. The plate 85 is preferably rigidly connected to the stub shaft 82 which protrudes through the cam plate 86. The stub shaft 82 is mounted by a suitable conventional low-friction bearing to the supporting structure 89 so that the entire wind turbine assembly can rotate about its vertical axis.

In order to use the power generated by rotation of the turbine assembly, spur gear teeth 120 may be provided on the circumference of the hub 122 surrounding the bearing 83. A spur gear 124, having teeth with a pitch permitting it to mesh with the teeth 120, may be mounted on the plate 86 adjacent to the hub 122. A possible arrangement is to provide a shaft 126 mounted to the plate 86 using suitable conventional low-friction bearings. The shaft 126 rotates as the turbine assembly 40 rotates due to the meshed gears 124, 120. The shaft 126 can be connected to a suitable conventional generator for electricity.

While blade design may be optimized further, it is presently envisioned that each blade 52 is mounted on the rotor 40 (see FIG. 7) such that a chord line 67 extending between the radially outer edge of the blade 52 and the radially inner edge of the blade 52 makes an angle $\theta$ with a radial line 69 passing through the center of rotation 72 and the radially inner edge of the blade. The angle $\theta$ is measured as positive in the circumferential direction corresponding to the direction of turbine rotation (see arrow 87). Preferably, the angle $\theta$ is selected to be greater than zero so that the radially outer edge of the blade 52 is angularly disposed in an advanced position relative to the radially inner edge of the blade 52.

Since the turbine means 40 is to be driven by naturally occurring wind, it is ordinarily important that the turbine means be as light as possible. Where lightest possible weight is desired, the turbine blades may be hollow so as to minimize their weight. A light weight foam material may, if desired, be disposed inside the blades to enhance their stiffness while maintaining the necessary low weight attribute.

Other considerations, including operating conditions where the ambient wind has erratic velocity perturbations, may dictate that blade design be adjusted to other than the lightest possible weight. For example, where the ambient wind is gusty, heavier blades may be desired to get the advantage of momentum and inertia that would come from a greater mass. Such increased momentum and inertia should dampen fluctuations in turbine wheel rotational rate that otherwise could result from such wind speed variations.

For light weight wind turbine installations, it is further contemplated that the rotor assembly 40 and related baffle portions will be designed so as to be easily replaceable. In this way, several turbine rotor assemblies can be designed, each for a different wind velocity. By simply removing the cover of the wind turbine assembly, the turbine rotor assembly is accessible and can be readily exchanged for a different turbine assembly adapted to the expected wind conditions. Thus, such interchangeable turbine rotor assemblies permit the operation to be tailored to the ambient wind conditions.

Furthermore, it may be desirable to use replaceable pillar walls 60, 62 in the center of the turbine assembly to accommodate different operating conditions. To this end it is contemplated that a variety of turbine assembly covers may be provided, each having differently shaped contours for the replaceable pillar walls, 60, 62. For example, baffles with different throat area dimensions may be provided, as well as baffles where the throat area dimensions are the same but different passage contours and/or configurations are provided. With this flexibility in design of the passage defined by the pillar walls 60, 62, operating conditions for the wind turbine can be optimized.

Now, in order to move the turbine blades 52 between different positions at different circumferential locations of the turbine assembly 40, an arrangement must be provided to cause the positional change. As seen in FIG. 8, each blade 52 is rotatably mounted on a lower plate 78 of the turbine rotor so as to be rotatable about a longitudinal axis 74. Suitable conventional bearing arrangements may be provided to adequately mount the blade 52 to the plate 78. While the particular means for moving the turbine blades 52 between two different positions can be any of many mechanical and electrical arrangements, a few of those arrangements will be described here.

A mechanical arrangement to cause positional change for the turbine blades may, for example, include a cam and follower arrangement. For example, each turbine blade 52 of the rotor assembly may include a stub shaft 88 that is mounted in the rotatable plate 78 by suitable conventional low-friction bearings, such as ball bearings, roller bearings, or needle bearings (not shown). In this way, each blade 52 is cantilever mounted on the lower plate 78 so as to be rotatable about the corresponding axis 74 of the turbine blade stub shaft 88. The bottom end of each stub shaft 88 may be provided with a yoke 90 having a pair of symmetrically disposed ends. Each end of the yoke 90 is provided with a corresponding cam roller 92a, 92b, each cam roller being rotatably mounted to the yoke 90.

Figure 9:
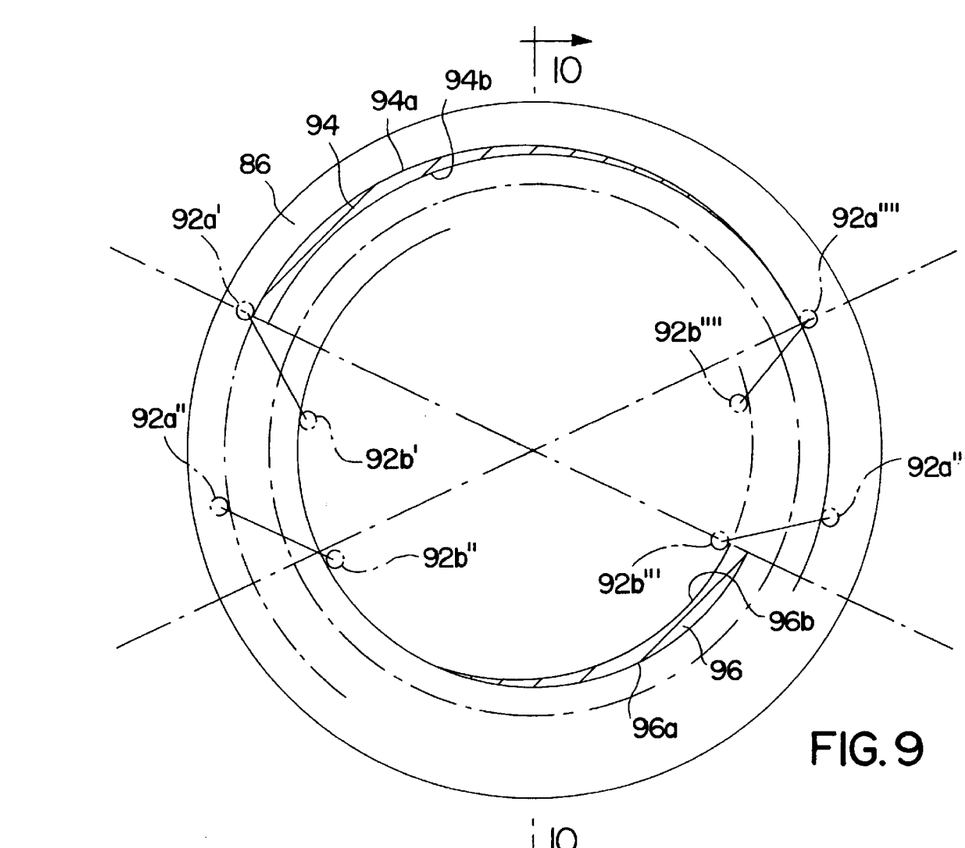
FIG. 9 is a partial cross-sectional view of the bottom plate taken along the line 9—9 of FIG. 8 showing the cam surfaces used in the wind turbine embodiment having mechanically controlled variable position turbine blades.

The rotationally fixed bottom plate 86 has a pair of arcuate cams 94, 96 (see FIG. 9). The outer cam 94 includes an outer arcuate surface 94a which gradually moves radially outwardly in the direction of rotation of the turbine assembly. In addition, the outer cam 94 includes an inner arcuate surface 94b that may have a constant radius. The inner cam 96 includes an outer arcuate surface 96a that may also have a constant radius. The inner cam 96 also includes an inner arcuate surface 96b which gradually moves radially inwardly in the direction of rotation of the turbine assembly. The radially outward distance between the start and the end of the outer cam surface 94b is substantially the same as the radially outward distance between the start and the end of the inner cam surface 96b.

Figure 10:
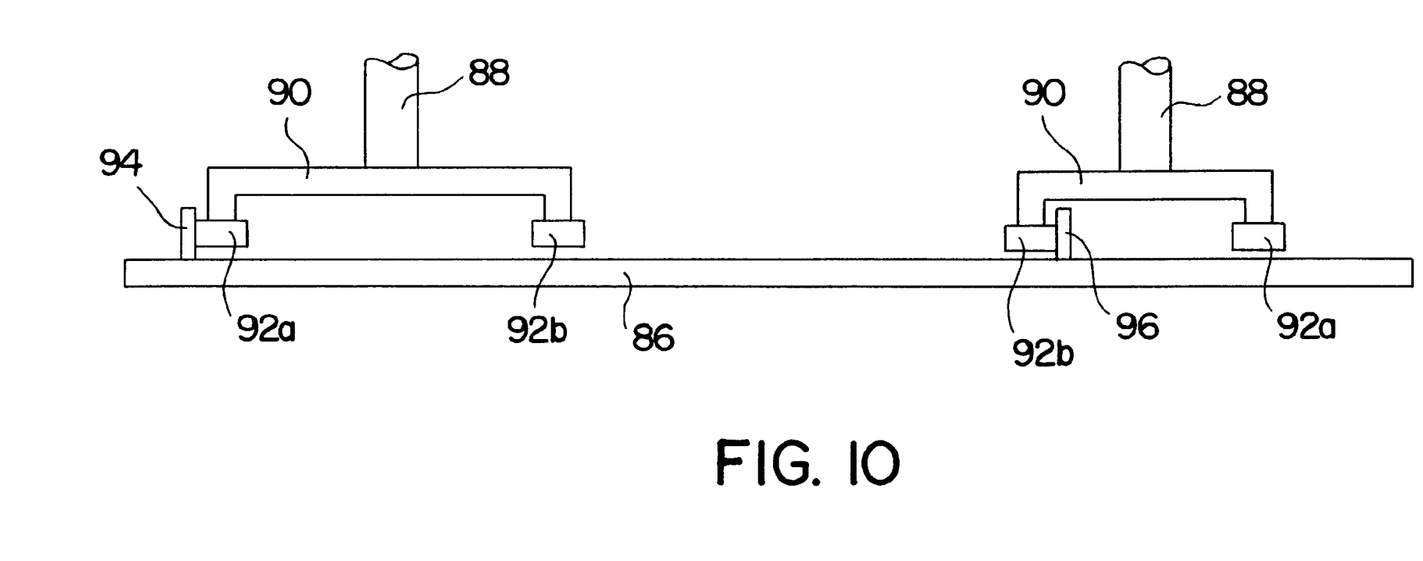
FIG. 10 is a partial cross-sectional view taken along the line 10—10 of FIG. 9 showing the turbine blade positioning cams for the mechanically controlled embodiment.

The cam wheels 92a (see FIG. 10) are positioned to engage the outer cam surface 94a of the outer cam 94, whereas the cam wheels 92b are positioned to engage the inner cam surface 96b of the inner cam 96. In this manner, the cam surface 94a causes each turbine blade 52 to rotate in a first direction (clockwise) through a predetermined angular displacement about the corresponding axis 74 to a first position, while the cam surface 96b causes each turbine blade to rotate in a second direction (counterclockwise) by a substantially equal angular displacement to a second position. The angular extent (see FIG. 9) of each cam surface 94a, 96b (measured at the center of the plate) may be selected as desired to determine how quickly the angular displacement of the turbine blades 52 between the first and second positions should occur. If desired, each turbine blade 52 may carry a pair of permanent magnets while the rotating plate 78 carries permanent magnets with opposite polarity at the first and second positions of the turbine blade 52. In this manner, each turbine blade 52 is magnetically detained in either the first or the second position such that the first cam surface 94b moves the blade 52 from the first angular position to the second angular position.

As the turbine assembly rotates about its vertical axis, the cam rollers 92a'''', 92b'''' of a turbine blade move from the second angular position to the first angular position shown as 92a', 92b', since the cam roller 92a is pushed radially outwardly by the cam surface 94a. As the turbine blade moves from the position 92a', 92b' to position 92a'', 92b'', the angular position of the blade does not change relative to the turbine assembly because neither cam surface 94a, 96a engages either cam roller 92a, 92b. As the turbine blade moves from position 92a'', 92b'' to position 92a''', 92b''', the inner cam surface 96b engages the trailing cam roller 92b and pushes it radially inwardly, thereby moving the turbine blade from the first angular position counterclockwise to the second angular position. Finally, as the turbine blade moves from position 92a''', 92b''' to position 92a'''', 92b'''', there is no change in the angular position of the blade since neither cam surface 94a, 96b engages either cam roller 92a, 92b. If desired, the constant radius portions of the inner and outer cams 96, 94 can be radially extended so that at least one of the cam rollers 92a, 92b is radially supported at all times as the cam rollers move circumferentially around the wind turbine.

As described above, the cams 94, 96 can cause the cam rollers 92a, 92b to alternately move radially outwardly, as shown in FIG. 9. It will be apparent to those skilled in the art that the cams 94, 96 could also be arranged to cause both cam rollers 92a, 92b to alternately move radially inwardly and obtain the same angular movements of the turbine blades. In addition, the inner and outer cam surfaces could be positioned so as to alternately work on just one of the cam rollers 92a, 92b so that cam roller is alternately moved radially outwardly and then radially inwardly, or vice versa. Suitable conventional guides or biasing systems can be provided to urge the cam rollers 92a, 92b into engagement with the corresponding cam surfaces.

Another approach for changing the position of the turbine blades 52 is to use a combination of permanent magnets and/or electromagnets For example, each turbine blade may be permanently magnetized along its longitudinal axis so that both its ends have different polarity. Alternatively, permanent magnets could be embedded in the turbine blades to provide the desired magnetic polarity. In FIG. 7, permanent magnets 100, 100a, 102, 102a are arranged in the turbine rotor assembly in pairs 100, 100a and 102, 102a at two preferred positions of the turbine blades so as to function as magnetic detents at the two preferred positions. Where the turbine blade 52 is magnetized along its longitudinal length, all the permanent magnets have the same polarity—opposite to the polarity at the end of the turbine blade 52. Where the turbine blade 52 has different polarity at the end adjacent permanent magnets 100, 102 that the polarity adjacent permanent magnets 100a, 102a, the permanent magnets 100, 102 have polarity opposite to the polarity of the permanent magnets 100a, 102a and the polarity is selected such that the magnet at the end of the turbine blade is attracted to the corresponding magnets 100, 100a, 102, 102a. It will be appreciated by those skilled in the art that it would be possible to use electromagnets for some or all of the permanent magnets 100, 100a, 102, 102a, if desired.

To move the turbine blades between the two magnetic detent positions, switching magnets are positioned on the housing (see FIG. 7). More particularly, a first switching magnet 110 may be located adjacent to the path of the turbine blades 52 on the baffle 60 at substantially the same elevation on the baffle as the magnetic area of the turbine blade. Similarly, a second switching magnet 112 may be positioned in the wall of the flow path next to the turbine blades 52 at substantially the same elevation as the magnetic area of the turbine blade. The first pair of switching magnets is located in the housing so that it is in position to trip each turbine blade 52 from the first detent position to the second detent position.

A second pair of switching magnets 114, 116 is located at a second circumferential location of the turbine blade path. The switching magnet 114 is located in the baffle 62 adjacent to the secondary air flow path at an elevation corresponding to the elevation of the magnetic area of the turbine blade. The remaining switching magnet 116 is located in the wall 64 at an elevation corresponding to the elevation of the magnetic area of the turbine blades. The second pair of switching magnets 114, 116 is operable to move each turbine blade from the second magnetic detent position to the first magnetic detent position.

The switching magnets 110, 112, 114, 116 may be permanent magnets or electromagnets (see FIG. 7). Each switching magnet has a magnetic polarity opposite to the polarity of the adjacent permanent magnets 100, 100a, 102, 102a (see FIG. 11) of the rotor and a magnetic strength selected so that it is powerful enough to overcome the magnetic attraction forces between the turbine blade and the associated permanent magnets 100, 100*a*, 102, 102*a*. The pairs of switching magnets are circumferentially offset from one another (see FIG. 11) so that they are juxtaposed with the permanent magnets in the corresponding detent position of the turbine blades. More particularly, the first pair of switching magnets 110, 112 are spaced to circumferentially correspond to the position of the permanent magnets 100, 100*a* (see FIG. 11). Similarly, the second pair of switching magnets 114, 116 (see FIG. 8) are circumferentially spaced to correspond to the position of the permanent magnets 102, 102*a*. The switching magnet 112 has the opposite polarity of the permanent magnets 100, 102—i.e., the same as the polarity of the adjacent blade. As a result, the switching magnet 112 pushes the blade from the first detent position (shown in FIG. 11) toward the second detent position (aligned with magnets 102, 102*a*). The other switching magnet 100 of the first pair of switching magnets has the same polarity as the permanent magnets 102*a*, 100*a*—i.e., opposite to the polarity of the adjacent blade. As a result, the switching magnet 110 pulls the blade from the first detent position toward the second detent position.

Figure 11:
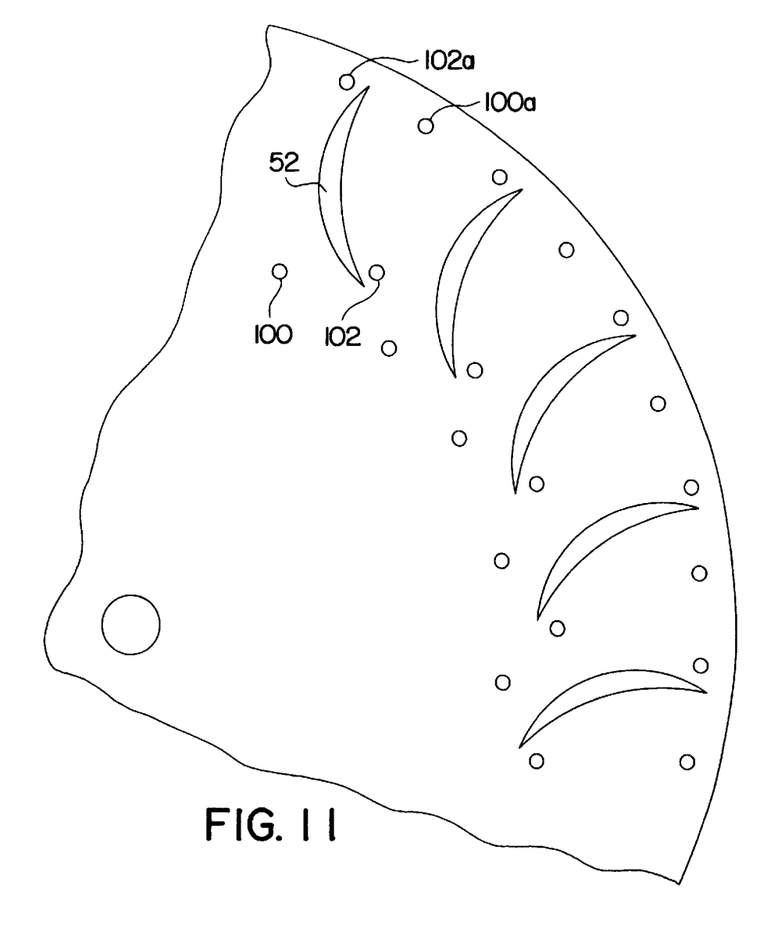
FIG. 11 is an enlarged partial view of the wind turbine having magnetically controlled variable position turbine blades.

The switching magnets of the second pair also have different polarities. The switching magnet 116 has the same polarity as the permanent magnets 100, 102—i.e., opposite to the polarity of the adjacent blade. As a result, the switching magnet 116 pulls the blade from the second detent position toward the first detent position. The other switching magnet 114 of the second pair of switching magnets has a polarity opposite to that of the permanent magnets 102*a*, 100*a*. Thus, as the rotor assembly turns, the switching magnet 114 pushes the blade from the second detent position toward the first detent position.

Other arrangements will also occur to those skilled in the art to regulate movement of the blades.

Operation of the wind turbine assembly when exposed to ambient wind can best be understood from FIG. 6. As the ambient wind enters the inlet, it is divided into a primary airflow and a secondary air flow by the stationary vane 25. Both the primary inlet opening 24 and the secondary inlet opening 26 accelerate the corresponding air streams into the turbine assembly 20.

The primary airflow engages the turbine blades 52 of the rotor assembly. A first portion of the primary airflow aerodynamically engages the turbine blades and passes into the chamber 58. Meanwhile, a second portion of the primary airflow pushes the blades 52 into the channel portion 54. By virtue of the converging channel defined by the inner surface of the blade channel and the outer surface of the first pillar wall 60, the second portion of the primary airflow accelerates into the blade channel. Thus, both portions of the primary airflow interact with the blades 52 to drive the rotor assembly.

Simultaneously, the secondary airflow collected by the secondary inlet enters the converging channel defined by the housing of the turbine and the curved wall 64. At the end of the channel, the secondary airflow is reversed in direction by the cusp wall 66 and enters the passage 56. The passage 56 is defined by the curved wall 64 and by the outer surface of the second pillar wall 62. As the turbine blades of the rotor assembly enter that passage 56, the secondary airflow substantially eliminates any vacuum drag on the turbine blades as they move forwardly toward the primary inlet opening 24. Depending on the operating conditions, the secondary airflow may also urge the turbine blades forwardly through the secondary channel. As the secondary airflow approaches the stationary dividing vane 25, an internal surface of that vane redirects the secondary flow so that it enters the chamber 58 in the center of the turbine rotor, between the first and second pillar walls 60, 62. The secondary airflow moves through the chamber 58 in confluence with the second part of the primary airflow.

The combined flow of the second part of the primary airflow and the secondary airflow pass through the central channel 58 where the combined flow may be accelerated by a cross-sectional area restriction defined between the first and second pillar walls 60, 62. This accelerated combined flow then moves radially outwardly across the blades 52 of the annular cascade, aerodynamically driving the turbine means, and exhausting through the outlet opening 28. At the outlet opening 28, the portion of the primary airflow which pushes the blades in the channel 54 is confluent with the other part of the primary airflow as well as the secondary airflow.

As a consequence of this arrangement of primary and secondary airflows, the turbine means is driven in the rearward direction by part of the primary airflow and is driven in the forward direction by the secondary airflow. Moreover, the turbine rotor is driven aerodynamically at both the inlet and exhaust locations where air enters and leaves the central channel 58. Meanwhile, the turbine is driven impulsively by the primary and secondary airflows in the annular path or channel 50.

To improve the operation of the turbine, the angular position of the turbine blades 52 may be adjusted as the blades move along their annular path. This arrangement is useful to adjust the angle $\theta$ of attack which the blades have relative to the primary and secondary airflows. For example, the main portion of the primary airflow engages the blades aerodynamically and traverses the cascade. But the secondary airflow, and a portion of the primary airflow for that matter, essentially blows down the annular cascade pushing the blades ahead of itself. By adjusting the angular relationship of the blades to the rotor assembly, the blade positions can be adjusted to improve operation in these two different operating conditions.

The turbine rotor may, for example, be attached to a suitable conventional electric power generator to convert the rotational energy imparted to the turbine by the primary and secondary airflows into electrical energy.

The wind turbine of this invention may be used in a variety of environments and may be scaled, or sized, as necessary for efficient utilization of wind energy. A small unit could be mounted on a car to supplement or supply the electrical requirements. Larger units might be used in open areas for supplementation and/or supply of household electricity requirements. Even larger units may be used on buildings as a supplement to the electrical power requirements.

One large scale installation suitable for use of a wind turbine might involve mounting the wind turbine on the roof of a building to gain access to stronger winds and to minimize air current distortions from adjacent structures.

From the foregoing it will now be apparent that a novel wind turbine assembly and a novel wind turbine installation have been disclosed which overcome problems of the type faced by the prior art. Moreover, it will be apparent to those skilled in the art that numerous variations, modifications, substitutions, and equivalents exist for features of the invention which do not materially depart from the spirit and scope of the invention. Accordingly, it is expressly intended that all such variations, modifications, substitutions, and equivalents which fall within the spirit and scope of the invention as defined in the appended claims be embraced thereby.

What is claimed is:

1. A wind driven turbine device comprising:
   a housing having sides, a primary inlet opening, a secondary inlet opening within the primary inlet opening, an exhaust opening, and guidance means for orienting the primary inlet opening in general alignment with atmospheric wind;
   turbine means for generating rotary power from atmospheric wind, rotatably mounted in the housing for movement in response to atmospheric wind movements;
   baffle means for directing wind through the housing and the turbine means, the baffle means connecting the primary inlet opening, secondary inlet opening, and the outlet opening of the housing while defining an annular path for the turbine means, directing a first portion of wind from the primary inlet through a first portion of the annular path, directing wind from the secondary inlet through a second portion of the annular path and into confluence with a second portion of the wind from the primary inlet, and directing confluent second portion of wind from the primary inlet and wind from the secondary inlet outwardly through the turbine means to the outlet;
   mounting means attached to the housing for rotatably supporting the housing while permitting movement of the housing about an axis; and
   means for moving individual ones of the turbine blades between a first position and a second position during movement of the rotor within the housing.

2. The wind driven turbine of claim 1 wherein the turbine means includes a plurality of blades each having a concave side and a convex side, each blade being mounted in an annular cascade such that wind from the primary inlet opening can flow radially inwardly across the turbine means, and each blade having a first and a second position.

3. The wind driven turbine of claim 1 wherein the inlet opening of the housing includes a stationary vane that divides incoming airflow between a primary air passage and a secondary air passage.

4. The wind driven turbine of claim 1 wherein the turbine blades are mechanically moved between the first and second positions during each revolution of the turbine means.

5. The wind driven turbine of claim 4 including a cam and cam follower means for mechanically moving the turbine blades between the first and second positions.

6. The wind driven turbine of claim 5 including a second cam and second cam follower means for mechanically moving the turbine blades between the second position and the first position.

7. A wind driven turbine device comprising:
   a housing having sides, a primary inlet opening, a secondary inlet opening within the primary inlet opening, an exhaust opening, and guidance means for orienting the primary inlet opening in general alignment with atmospheric wind;
   turbine means for generating rotary power from atmospheric wind, rotatably mounted in the housing for movement in response to atmospheric wind movements;
   baffle means for directing wind through the housing and the turbine means, the baffle means connecting the primary inlet opening, secondary inlet opening, and the outlet opening of the housing while defining an annular path for the turbine means, directing a first portion of wind from the primary inlet through a first portion of the annular path, directing wind from the secondary inlet through a second portion of the annular path and into confluence with a second portion of the wind from the primary inlet, and directing confluent second portion of wind from the primary inlet and wind from the secondary inlet outwardly through the turbine means to the outlet;
   mounting means attached to the housing for rotatably supporting the housing while permitting movement of the housing about an axis; and
   means for moving the turbine blades between a first position and a second position during movement of the rotor within the housing, including magnetic means for moving the turbine blades between the first and second positions during each revolution of the turbine means.

8. The wind driven turbine of claim 7 wherein the magnetic means includes a permanent magnet for each of the turbine blades and wherein each turbine blade includes a permanent magnet.

9. The wind driven turbine of claim 8 wherein the magnetic means includes permanent magnets in each of the two positions of the turbine blades for holding the blades in each of those two positions.

10. The wind driven turbine of claim 8 wherein a pair of electromagnets are positioned at each of the two positions of the turbine blades for holding the blades in each of those two positions.

* * * * *